Nov. 7, 1933.    N. H. RICKER    1,934,447
MEANS AND METHOD OF ELECTRICAL PROSPECTING
Filed Feb. 16, 1929    2 Sheets-Sheet 1
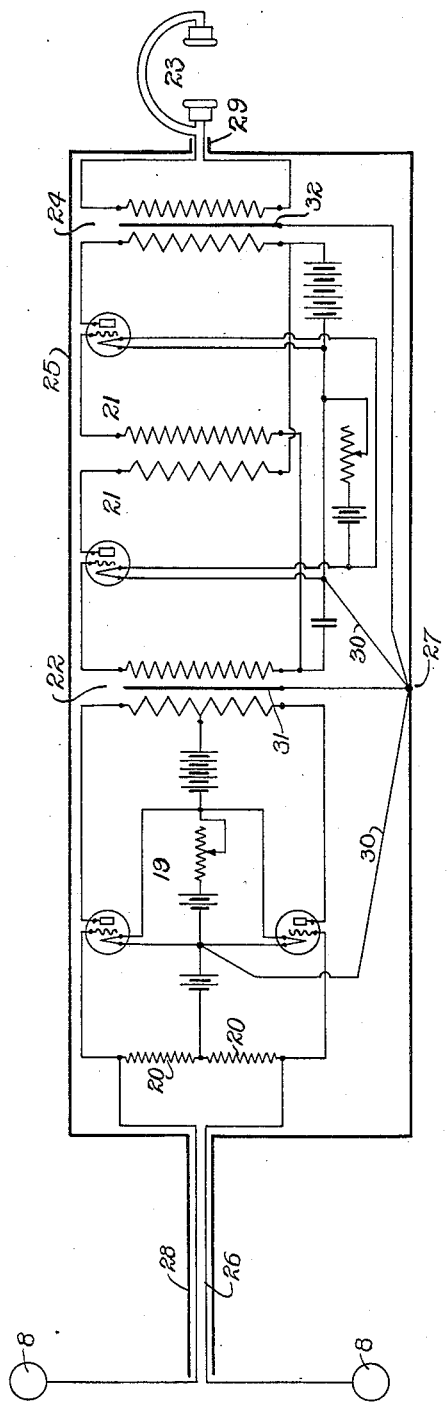
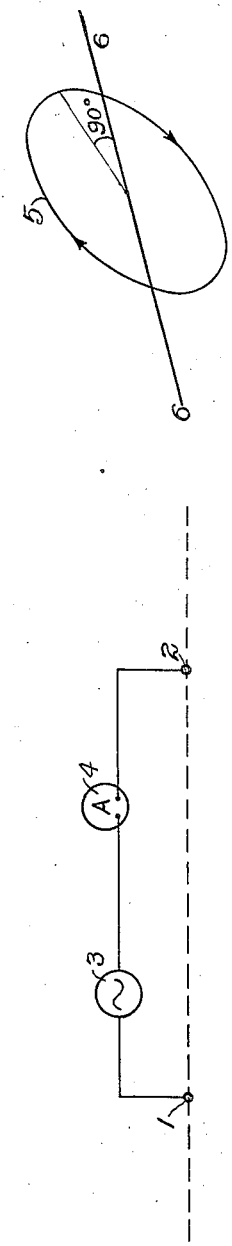
Norman H. Ricker
INVENTOR
BY Jesse R. Stone
ATTORNEY Nov. 7, 1933.   N. H. RICKER   1,934,447
MEANS AND METHOD OF ELECTRICAL PROSPECTING
Filed Feb. 16, 1929   2 Sheets-Sheet 2

Norman H. Ricker
INVENTOR
BY Jesse R. Stone
ATTORNEY

Patented Nov. 7, 1933

1,934,447

UNITED STATES PATENT OFFICE 1,934,447

MEANS AND METHOD OF ELECTRICAL PROSPECTING

Norman H. Ricker, Houston, Tex.

Application February 16, 1929. Serial No. 340,481

24 Claims. (Cl. 175—182)

This invention relates to a means and method of exploring the regions beneath the surface of the earth for deposits of petroleum, natural gas, asphalt, certain metallic sulphides, mineral masses and other substances or formations whose electro-magnetic constants are different from those of the surrounding earth.

This invention lies within the realm of electro-magnetic methods and comprises causing alternating electric currents to flow in the earth and observing the electric field associated with such currents as an indication of the formation which they have encountered, but the principles therein involved are novel as compared with those previously practiced.

One object of this invention is to provide a method of observing and measuring the electric field in distinction from most previous methods which have concerned themselves with observations on the magnetic field.

A further object of this invention is to provide an apparatus for making observations by means of this method and thereby gaining knowledge of the nature of the earth's subsurface.

A still further object of my improved method is to simplify the apparatus necessary in this sort of prospecting and to simplify the survey and observations which are to be taken.

It is well understood by those versed in the art that the magnetic field set up in the neighborhood of conducting bodies, due to an alternating electric current, is of an elliptical or rotating nature. The electric field, due to such alternating electric currents is also of an elliptical or rotating nature in the neighborhood of conducting masses.

It is also an object of my invention to provide an apparatus which will directly indicate the plane of the vibration ellipse of said electric field by determining the direction of its normal, which direction may be read directly upon the instrument.

Other and further objects of my improved means and method will readily be apparent to those skilled in the art to which the improvement appertains and I do not desire to be limited by the present embodiment of the means and method except insofar as to disclose the operation and construction thereof.

In explaining my invention, I will refer to the drawings herewith, wherein Fig. 1 shows the means whereby the alternating electric current is passed through the earth in the region to be prospected.

Fig. 2 shows diagrammatically the elliptical electric vibration and the direction normal to the plane of this vibration ellipse.

Fig. 3 shows a wiring diagram of my apparatus.

Figure 5:
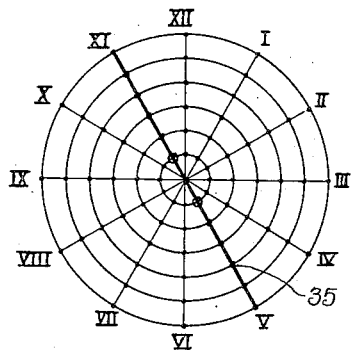
Fig. 5 is a map of the surveyed region being prospected and shows the manner of making observations along radii passed through the electrodes.

The means and method herein described are different from those heretofore in use and involve a somewhat different theory. Instead of determining the nature of the magnetic field, it is the nature and location of the electric field which is determined. This electric field is ellipitically polarized, the vibration taking place in an elliptical manner, the ellipse of course lying in a plane.

If a straight metallic bar or wire is set up in this alternating electric field, electric currents will be in general induced in this wire, regardless of the position in which the wire may be orientated in space, except for one particular direction. This direction is along the normal to the plane of the vibration ellipse of the electric field. When the wire is in this position no indication is received because the wire lies along the normal to the plane of the vibration ellipse of the electric field and there is thus no component of the electric field along the direction of the wire and therefore no induced current. My invention therefore consists in developing the apparatus and theory involved in determining the plane of the vibration ellipse or the normal passing thru such plane. To this end I have arranged devices for passing an alternating electric current through the earth by means of two electrodes imbedded therein. In Fig. 1, 1 and 2 show such electrodes. An alternating current generator is shown at 3, whose frequency may lie anywhere from a few cycles per second up to 20,000 cycles, or even higher. 500 cycles is a convenient value of the frequency because it is distinctly audible in the detecting devices and observations may be made with it by using fairly simple apparatus. The voltage of this generator should be sufficient to enable currents in the neighborhood of 10 amperes, more or less, to be passed through the earth. 110 volts is generally a suitable value of the voltage but this may be varied to obtain desired results. An ammeter is shown at 4, which may be used for measuring the current. The electro-magnetic field associated with this alternating electric current may be observed at any point or points over the surface of the earth or in cavities beneath the surface of the earth, and consists of two parts, a magnetic vector, and an electric vector at any particular instant. In the course of changing time, when an alternating current is used, the directions and magnitudes of these vectors are continually changing, with a result that both the electric and magnetic field are elliptically polarized. The alternating current generator causes an alternating difference in potential between the two electrodes imbedded in the earth's surface and this difference in potential is transmitted to the various points in space according to the wave equation in conducting and insulating media. It is this difference in potential, which is constantly varying, which enables me to make the observations upon which my theory is based. Unlike previous inventions, the present invention concerns itself with observations not upon the magnetic field, but upon observations of the electric field. Fig. 2 shows the elliptical nature of the electric field, whose direction of vibration is represented by the arrows on the ellipse. The line 6 is drawn perpendicular to the plane of this vibration ellipse.

Figure 4:
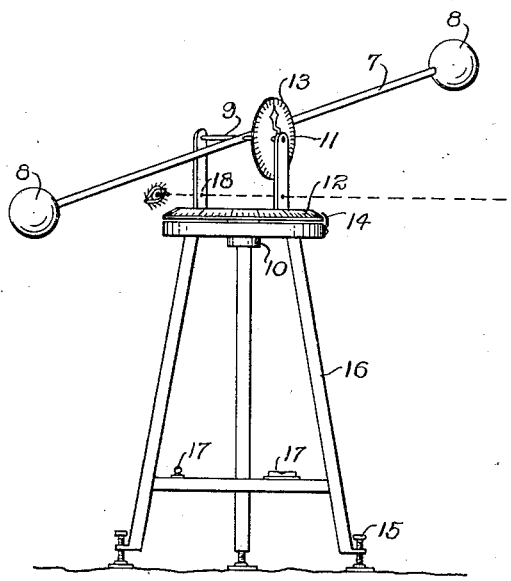
Fig. 4 shows a side elevation of the apparatus for detecting the electric field.

In order to make observations of this electric field, I employ the pick-up apparatus shown in Fig. 4, wherein 7 represents a beam carrying at its ends metallic spheres or plates to provide capacity at the ends of the beam in order to increase the magnitude of the currents set up in the wire.

This beam is mounted in such a manner that it may be rotated about a horizontal axis 9, and also the vertical axis 10. Two sets of graduated circular scales 11 and 12 enable angular rotations about the two axis 9 and 10 to be determined by means of the indices 13 and 14. Leveling screws 15 may be attached to the feet of the tripod or other support 16 so that the instrument may be leveled by means of the spirit levels 17. A peep sight 18 or telescope enables the angular bearing of survey lines to be determined so that the orientation of the instrument with respect to survey lines may be determined. The electrical connections are shown in Fig. 3, wherein as before 8 shows the two metallic spheres upon the ends of the rotatable beam 7 and which are connected by lead in wires 26 with the input of a push-pull amplifier 19, through two high resistance units 20. This push-pull amplifier is coupled with a two stage audio-frequency amplifier 21, by means of the shielded transformer 22. The output of this two stage amplifier 21 is connected with a pair of telephone receivers 23 by means of the shielded transformer 24.

The entire amplifier is surrounded by a metal box or casing 25, which serves to shield the amplifier from undesirable extraneous electro-magnetic fields. The shielding 28 is preferably provided over the lead-in wires 26 from the pick up apparatus, as shown in Fig. 3. It is also desirable that the telephone receivers and connecting cords be similarly shielded as at 29, this latter shield making connection with the shield 25 of the amplifier. The common point of all stages of the amplifier should be connected to the shield by separate wires such as 30 which wires converge at a single point 27. The shields 31 and 32 of the two shielded transformers are preferably also connected to this point 27. Such an arrangement prevents undesirable oscillations from being set up in the amplifier.

In making observations with my apparatus I first pass an alternating electric current through the earth in the manner shown in Fig. 1. I then set up at a selected spot over the earth's surface the pick-up apparatus shown in Fig. 4, and level it by means of the leveling screws 15 and spirit levels 17. I then rotate the apparatus about the vertical axis 10 until upon looking through the peep sight 18, I find the horizontal axis 9 pointing along some particular survey line to which observations are to be referred. I then rotate the apparatus about both the horizontal axis 9 and the vertical axis 10 until no sound is heard thru the amplifier in the telephone receiver 23. The graduated circles 11 and 12 are then read so that this position of the beam may be recorded. When no sound is heard, the direction of the beam 7 lies along a line perpendicular to the plane of the vibration ellipse of the alternating electric field. From matters of symmetry it is readily seen that if observations are made along the line connecting the two electrodes, and along this line produced as in Fig. 5, the plane of the vibration ellipse of the electric field must be vertical and intersect the earth's surface along the electrode line. This is the case in perfectly normal homogeneous earth. If then I determine the null point at a position along this electrode line in normal homogeneous earth, the beam 7 will then be horizontal and at right angles to the electrode line. This enables observations to be very much simplified.

In planning a survey I therefore run a series of straight lines, as shown in Fig. 5, making sensibly equal angles with one another and passing through a common point as shown. Stations are spaced at sensibly equal intervals along these lines and may be described as station 4, line 5, as shown by the point 35. A convenient spacing of these stations may be 250 feet. In making observations along lines V and XI, the electrodes are placed as station 1, line V, and station 1, line XI. In making observations on lines X and IV, the electrodes are placed at station 1, line X, and station 1, line IV, etc. As long as the earth's sub-surface is homogeneous the beam 7 must be horizontal and the horizontal axis 9 will be along the survey line when the null is reached. As soon, however, as observations are made in a region underlain by mineral deposits, or other masses, whose electro-magnetic constants differ from those of the homogeneous earth, the direction of the currents will be altered, symmetry will no longer in general exist, and the electro-magnetic field over the earth's surface will thereby be distorted. As a result the plane of the vibration ellipse of the electric field as observed along the electrode line will no longer necessarily be vertical, but will be tilted over to one side, or the other, depending upon the nature of the earth's non-homogeneity. Accordingly the beam 7 when perpendicular to this ellipse will not be horizontal, but will accordingly be tilted down at one end or the other. Also the horizontal axis 9 need not now lie along the survey line but may be skewed through a slight angle.

Figure 6:
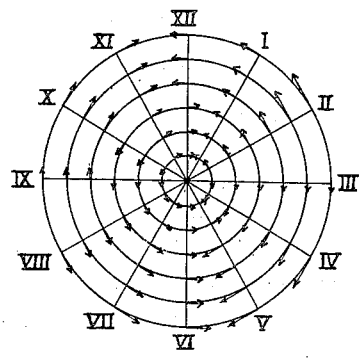
Fig. 6 shows a similar map whereon the observations have been plotted.

After observations have been made at all desired stations the results are plotted as shown in Fig. 6, which is a map of the surveyed area showing the survey lines and stations. At each station an arrow is drawn perpendicular to the survey line of magnitude equal to some function of the angular tilt of the beam 7, the sense of the arrow being determined by which end of the beam is lowest. These arrows may be proportional to the angle or sine of the angle, or any other function which is convenient. Since these arrows depict the distortion of the electric field, we may use them as a guide in determining the distortion of the currents in the earth, and thereby obtain information as to the nature of the buried mineral deposits. The horizontal angle through which the horizontal axis 9 may be skewed is not shown plotted as it is not so important as the angle through which the beam is tilted. However, a similar plot may be made of these horizontal angles as well.

It is to be distinctly understood that my means and method of observing the electric field are not limited to observations made in this radial type of survey just described. The use of this radial type survey, however, wherein observations are confined to the electrode line, is to be considered within the scope of this invention. Observations with my apparatus and method may be made along rectangular, checker board, or any other type of survey.

Having described my invention, what I claim is:

1. A method of exploring for underground mineral deposits comprising, causing alternating electric currents to flow in the earth, determining at a series of points over the surface of the earth the angular position in space of the normal to the plane of the vibration ellipse of the electric field associated with said currents, and co-ordinating the data so obtained.

2. A method of exploring for underground mineral deposits comprising, causing alternating electric currents to flow in the earth, determining at a series of points over the surface of the earth the angular position in space of the normal to the plane containing the elliptically polarized electric field associated with said currents, and co-ordinating the data so obtained.

3. A method of exploring for underground mineral deposits comprising passing an alternating electric current through a selected portion of the earth, determining at a series of points over the surface of the earth the angular position in space of the plane containing the elliptically polarized electric field associated with said current, and co-ordinating the data so obtained.

4. A method of exploring for underground mineral deposits comprising passing an alternating electric current through a selected portion of the earth, determining distortions of the surface formed by the elliptically polarized electric field associated with said current and co-ordinating the data so obtained.

5. A method of exploring for underground mineral deposits comprising fixing two spaced electrodes in the earth, passing an alternating electric current between the electrodes, observing at a series of points above a line on the earth's surface passing through the said electrodes, distortions of the surfaces formed, by the elliptically polarized electric fields associated with said current, and co-ordinating the data so obtained.

6. A method of exploring for sub-surface deposits of minerals comprising marking off on a portion of the earth's surface a series of spaced concentric circles, locating a set of spaced diameters in said circles, burying a pair of electrodes along a diameter at points equally spaced from the center, causing an alternating electric current to pass between said electrodes, observing the azimuth and tilt of the normal to the surfaces of elliptically polarized electric fields along said diameter, and plotting the data thus obtained.

7. A method of exploring for sub-surface deposits of minerals comprising marking off on a portion of the earth's surface a series of spaced concentric circles, locating a set of spaced diameters in said circles, burying a pair of electrodes along a diameter at points spaced equally from the center, causing an alternating electric current to pass between said electrodes, determining at a series of points over said diameter the angular positions in space of the normals to the planes tangent to the surface formed in space by the elliptically polarized electric fields associated with said current, and co-ordinating the data so obtained.

8. A method of exploring for sub-surface deposits of minerals comprising marking off on a portion of the earth's surface a series of lines passing through a common point, the lines making sensibly equal angles each with the next, locating a series of sensibly equally spaced stations along these lines, burying a pair of electrodes along one of these lines, causing an alternating electric current to pass between said electrodes, observing the azimuth and tilting of the normal to the plane containing the vibration ellipse of the electric field along said line, varying the positions of said electrodes and observation points from one line to another and plotting the data so obtained.

9. A method of exploring for sub-surface mineral deposits comprising burying two spaced electrodes beneath the surface of the ground, passing an alternating electric current between said electrodes, making observations over the straight line passing through the electrodes, charting the surfaces formed in space by the alternating electric fields associated with said alternating electric current, and noting the distortion of said surfaces from the normal.

10. A method of exploring for underground mineral deposits comprising fixing two spaced electrodes beneath the surface of the earth, passing an alternating electric current through the earth by means of these electrodes, determining at a series of points over the surface of the earth the angular position in space of the normal to the plane of the elliptical electric field associated with said alternating electric currents, and correlating the data thus obtained.

11. A method of exploring for underground mineral deposits comprising causing alternating electric currents to flow in the earth, making observations at a series of points over the surface of the earth of the rotating electric field associated with said currents and co-ordinating the data thus obtained.

12. A method of exploring for underground mineral deposits comprising setting up an alternating electro-magnetic field in the region to be explored and making observations at a series of points over the earth's surface of the rotating electric component of said electro-magnetic field and co-ordinating the data thus obtained.

13. A process of determining the location of underground formations including passing an alternating electric current into the earth and observing the location of the normals to the planes of vibration of an electric field caused by this alternating electric current.

14. A process of sub-surface exploration including recording observations of the inclination of the plane of vibration of an electric field associated with an alternating electric current which has been passed into the earth in order to obtain such observations.

15. A process of sub-surface exploration including, recording observations of the deviation from normal of the plane of vibration and normal to that plane of an electric field associated with an electric current which is being passed through the earth thru a conducting mass.

16. A method of observing the deviation from normal position of the plane of vibration of an elliptically polarized electric field associated with an electric current which has been passed into a conducting mass, including manipulating a pick up apparatus to determine the location of the line perpendicular to the plane of the aforesaid electric field at the point of the apparatus.

17. An apparatus for use in sub-surface prospecting including a support, a first member rotatable on said support about a vertical axis, a circular scale attached to said first member, an index on said support, a second member rotatable on said first member about a horizontal axis and with a circular scale affixed to said second member with index on said first member, said second member carrying a beam with metallic spheres at the ends for picking up the difference of potential between two points in space.

18. A device for exploring the earth's sub-surface comprising a rotatable apparatus including means for picking up the difference in potential between two points in space, an amplifying means to amplify the difference in potentials, and means connected thereto for indicating the magnitude of said amplified potentials, said second means including devices for increasing the magnitude of the difference in potentials picked up.

19. An apparatus for use in subsurface prospecting, including a tripod, a scale mounted on a vertical axis of rotation, a horizontal axis mounted on said scale, and means rotatable about said horizontal axis to pick up vibrations of an electric field, said means including a beam and a metallic mass mounted upon each end thereof.

20. A method of exploring for underground mineral deposits which consists in fixing two spaced electrodes in the earth, passing an alternating electric current between the electrodes, making a series of observations of the normal to the plane of the vibration ellipse of the electric field along a plane of symmetry of said electric field due to said currents and coordinating the data so obtained to determine the presence and location of mineral deposits.

21. A method of chartering an alternating electric field which is elliptically polarized, consisting in determining the direction in space of the normal to the plane of the vibration ellipse of said electric field.

22. A method of determining the nature of the interior of a conducting mass which consists in causing alternating electric currents to flow in said conducting mass, making observations at points exterior to said conducting mass, of the direction in space relative to said conducting mass of the normal to the plane of the vibration ellipse of the electric field due to the alternating electric currents flowing in said conducting mass, and coordinating the data thus obtained.

23. A method of determining electrical asymmetry of a conducting mass which consists in causing an alternating electric current to flow in said conducting mass and making observations at points lying on a plane which would be a plane of symmetry of the electric field were the conducting mass electrically symmetric, such observations being the determination of the direction of the normal to the vibration ellipse of the resulting elliptically polarized electric field, and noting deviations of this direction from the direction normal to the supposed plane of symmetry.

24. A method of charting an alternating electric field which is elliptically polarized, consisting in manipulating a conductor about in the field, until it lies in such a position that there is no alternating electric current induced into it so that the direction of such conductor when there is no induced current therein indicates the normal to the vibration ellipse of said alternating electric field.

NORMAN H. RICKER.